US009517761B2

(12) United States Patent
Kokal et al.

(10) Patent No.: US 9,517,761 B2
(45) Date of Patent: Dec. 13, 2016

(54) METHOD FOR COMPENSATING ROTATIONAL IRREGULARITIES OF AN INTERNAL COMBUSTION ENGINE OF A DRIVE TRAIN OF A HYBRID VEHICLE

(71) Applicant: AVL LIST GMBH, Graz (AT)

(72) Inventors: Helmut Kokal, Graz (AT); Luigi Del Re, Linz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 14/652,356

(22) PCT Filed: Dec. 12, 2013

(86) PCT No.: PCT/EP2013/076381
§ 371 (c)(1),
(2) Date: Jun. 15, 2015

(87) PCT Pub. No.: WO2014/095565
PCT Pub. Date: Jun. 26, 2014

(65) Prior Publication Data
US 2015/0344022 A1      Dec. 3, 2015

(30) Foreign Application Priority Data

Dec. 21, 2012   (AT) .............................. A 50614/2012

(51) Int. Cl.
*B60L 9/00*        (2006.01)
*B60W 20/00*    (2016.01)
(Continued)

(52) U.S. Cl.
CPC .............. *B60W 20/108* (2013.01); *B60K 6/48* (2013.01); *B60L 15/20* (2013.01); *B60W 10/08* (2013.01);
(Continued)

(58) Field of Classification Search
CPC .... B60W 20/108; B60W 20/15; B60W 20/17; B60W 6/48; B60W 10/08; B60W 20/00; B60W 30/20; B60W 2030/206; B60W 2050/001; B60W 2050/0042; B60W 2050/0089; B60W 2510/0638; B60W 2510/0657; B60W 2510/081; B60W 2710/083; B60L 15/20; Y02T 10/6221
(Continued)

(56) References Cited

U.S. PATENT DOCUMENTS 8,812,184 B2 *  8/2014  Hakumura .............. B60L 3/003
                                                                  123/192.1
9,134,712 B2 *  9/2015  Kokal .................. G05B 13/048
                                                                  702/113
(Continued)

FOREIGN PATENT DOCUMENTS

DE        19939250         3/2001
DE        102009047116   5/2011
WO       2012156258      11/2012

OTHER PUBLICATIONS

English Abstract of DE 102009047116.
(Continued)

*Primary Examiner* — Shardul Patel
(74) *Attorney, Agent, or Firm* — Dykema Gossett PLLC

(57) ABSTRACT

An electric motor (2) of a drive train (1) of a hybrid vehicle is controlled by determining the shaft torque ($T_W$) of a current work cycle (n) of an included internal combustion engine (3) and feeding the shaft torque ($T_W$) to a compensation controller (K) which has stored the shaft torque ($T_W(n-1)$) of a preceding work cycle (n-1) of the internal combustion engine, and calculating a compensated shaft torque ($T_{komp}$) from the shaft torque ($T_W(n)$) of the current work cycle (n), the shaft torque ($T_W(n-1)$) of a previous work cycle (n-1), and the shaft torque of a previous work
(Continued)

cycle (n−1) shifted by a system delay, which compensated shaft torque ($T_{komp}$) is linked to a target torque ($T_{soll}$) predefined by a higher-level control unit (15) to determine the controlling torque ($T_{stell}$) for the electric motor.

4 Claims, 2 Drawing Sheets

(51) Int. Cl.
*B60L 15/20* (2006.01)
*B60K 6/48* (2007.10)
*B60W 10/08* (2006.01)
*B60W 30/20* (2006.01)
*B60W 50/00* (2006.01)

(52) U.S. Cl.
CPC .............. *B60W 20/00* (2013.01); *B60W 20/15* (2016.01); *B60W 20/17* (2016.01); *B60W 30/20* (2013.01); *B60W 2030/206* (2013.01); *B60W 2050/0012* (2013.01); *B60W 2050/0042* (2013.01); *B60W 2050/0089* (2013.01); *B60W 2510/0638* (2013.01); *B60W 2510/0657* (2013.01); *B60W 2510/081* (2013.01); *B60W 2710/083* (2013.01); *Y02T 10/6221* (2013.01); *Y02T 10/7258* (2013.01); *Y10S 903/906* (2013.01)

(58) Field of Classification Search
USPC ........................ 701/22; 180/65.265; 903/930
See application file for complete search history.

(56) References Cited

U.S. PATENT DOCUMENTS

| | | | |
|---|---|---|---|
| 2006/0288764 A1* | 12/2006 | Langthaler | G01M 13/025 73/114.15 |
| 2008/0016599 A1* | 1/2008 | Dreibholz | B60K 6/48 180/65.25 |
| 2010/0274421 A1* | 10/2010 | Falkenstein | B60K 6/445 701/22 |
| 2011/0238359 A1* | 9/2011 | Kokal | G05B 13/048 702/113 |
| 2012/0078456 A1* | 3/2012 | Hakumura | B60L 3/003 701/22 |

OTHER PUBLICATIONS

English Abstract of DE 19939250.
Kokal et al, "Bandwidth extension of dynamical test benches by modified mechanical design under adaptive feedforward disturbance rejection," American Control Conference 2010, Baltimore, MD (Jun. 30-Jul. 2, 2010) IEEE Jun. 30, 2010, pp. 6151-6156.
C. Beidl et al., "Effizienter E-Fahrzeugantrieb mit dem Kompakten CEA-Konzept—Combustion Engine Assist," 7$^{th}$ MTZ Symposium the Drive System of Tomorrow, Jan. 24-25, 2012, Wolfsburg.

* cited by examiner

METHOD FOR COMPENSATING ROTATIONAL IRREGULARITIES OF AN INTERNAL COMBUSTION ENGINE OF A DRIVE TRAIN OF A HYBRID VEHICLE

BACKGROUND OF THE INVENTION

Field of the Invention

The present invention relates to a method for compensating for the rotational irregularities of an internal combustion engine of a drive train of a hybrid vehicle, wherein an electric motor of the drive train is connected via a drive shaft to the drive wheels and via an engine shaft to the internal combustion engine, which introduces rotational irregularities into the drive train, and the electric motor is controlled by a drive controller which supplies a controlling torque to the electric motor.

The Prior Art

A known drive train concept of a modern hybrid vehicle includes an electric motor which drives the drive wheels of the vehicle, optionally a transmission, a differential gear and side shafts, via a drive shaft. The electric motor is additionally connected to an internal combustion engine via a coupling and connecting shaft in order to increase the cruising range of the hybrid vehicle. For this purpose, smaller internal combustion engines are used, e.g., 2- or 3-cylinder engines, since the internal combustion engine is only used for supporting the electric motor. However, due to the combustion impacts, the internal combustion engine has a cyclically varying torque, resulting in rotational irregularities at the drive (or flywheel) of the internal combustion engine. These rotational irregularities propagate via the electric machine into the drive train and are sensed there as vibrations, which reduces the driving comfort of the hybrid vehicle.

Thus, control strategies which try to compensate for these rotational irregularities in the drive train have already become known. For example, a control that compensates for the rotational irregularity by means of a so-called Harmonic Oriented Control (HOC) has been introduced as part of the lecture "Efficient E-vehicle drive with the compact CEA concept—Combustion Engine Assist", C. Beidl et al., 7th MTZ symposium The drive system of tomorrow, January 24 and 25, 2012, Wolfsburg. Here, analogously to the field-oriented control of electric motors, a Park's transformation of the torsional vibrations into a coordinate system rotating synchronously with the frequency of the vibration is performed. In the course of this, accelerations involved in the vibration are compensated for the new coordinate system by means of two PI controllers so that after the inverse transformation, a compensation portion of the target torque to be predefined is obtained, which is used to correct the target torque of the speed controller of the electric motor.

A similar concept can be found in WO 2012/156258 A2, wherein here the compensation is carried out prior to the field-oriented control of the electric motor.

Both methods have in common that relatively high computing effort is required for performing the transformations, which also results in a correspondingly powerful computing unit for the implementation in the vehicle.

DE 10 2009 047 116 A1 and DE 199 39 250 A1 describe methods for compensating a rotational irregularity in a drive train from an internal combustion engine and an electric motor, in which first the rotational irregularity is determined, and the electric motor is controlled to counteract the rotational irregularity. However, due to the system delays and the disadvantages of the controller, this is only possible up to a certain degree of the dynamic of the rotational irregularity.

It therefore was an object of the present invention to propose an alternative control of an electric motor of such a drive train of a hybrid vehicle, which can be implemented and carried out in a particularly simple manner.

SUMMARY OF THE INVENTION

This object is achieved according to the invention in that the shaft torque of the engine shaft of the current work cycle of the internal combustion engine is detected and is fed to a compensation controller, the shaft torque of a previous work cycle of the internal combustion engine is stored in the compensation controller, and a compensated shaft torque is calculated from the shaft torque of the current work cycle, the shaft torque of a previous work cycle and the shaft torque of a previous work cycle shifted by a system delay, which compensated shaft torque is linked to a target torque predefined by a higher-level control unit to determine the controlling torque in order to compensate the rotational irregularities of the internal combustion engine by means of the electric motor.

In this manner it can be achieved that the controlling torque includes a component that is adjusted for the system delay (and thus lies in the future), so that this anticipation enables the drive controller of the electric motor to respond sufficiently early and fast to rotational irregularities of the engine shaft and to correct them, particularly without additional intervention in the drive control. Thus, the rotational irregularities are compensated for by the electric motor of the drive train, whereby the rotational irregularities are prevented from propagating into the drive train.

The basic concept of the control according to the invention is known from WO 2010/023228 A2; however, the context thereof is completely different and the objective is completely different. Here, the control is used in a test bench arrangement to damp resonances at a connecting shaft originating from the internal combustion engine and electric loading machine if the resonance frequency falls into the range of the operating frequency of the combustion engine, so that high dynamic in the test bench can be implemented. Furthermore, the control is used to track the rotational irregularities of the internal combustion engine with the loading machine as accurately as possible in order to avoid excitation. Thus, the loading machine is controlled in such a manner that it follows the speed of the internal combustion engine as accurately as possible so that the loading machine rotates with the same rotational irregularity as the internal combustion engine.

However, it has to be avoided in the hybrid vehicle that the electric motor rotates with the same rotational irregularities because they would otherwise be directly transferred into the drive train. Moreover, the drive train of a hybrid vehicle is normally mechanically designed in such a manner that no resonances can occur since this would cause problems during the real operation of the hybrid vehicle. Thus, the principally same control concept is used completely differently.

The shaft torque at the engine shaft can be determined in a simple manner when the speed of the internal combustion engine and the speed of the electric motor are detected and are fed to a torque estimator which estimates a current shaft torque of the engine shaft therefrom. Such torque estimators are well known per se and are capable of processing the measured values of the speeds, which are already present in the drive train, in a simple manner. Thus, the more complicated direct measurement of the shaft torque can be avoided.

Advantageously, a shaft torque adjusted for the constant component is determined. The reason for this is that only the alternating component of the torque transmitted from the internal combustion engine to the electric motor is responsible for the rotational irregularities. It is therefore expedient to determine only the alternating component of the shaft torque.

Particularly advantageously, a transient shaft torque is calculated from the shaft torque of the current work cycle and the shaft torque of a previous work cycle by subtracting the current shaft torque from the stored preceding shaft torque, a predictive shaft torque is determined by compensating the system delay in the stored preceding shaft torque, and the compensated shaft torque is determined as sum of the predictive shaft torque and the transient shaft torque. This can be done with only a few operations, which reduces the computing effort for determining the compensated shaft torque significantly.

BRIEF DESCRIPTION OF THE DRAWINGS

The present invention is explained in greater detail below with reference to the FIGS. 1 and 2 which schematically and nonrestrictively show advantageous configurations of the invention. In the figures.

DETAILED DESCRIPTION OF THE EMBODIMENTS

Figure 1:
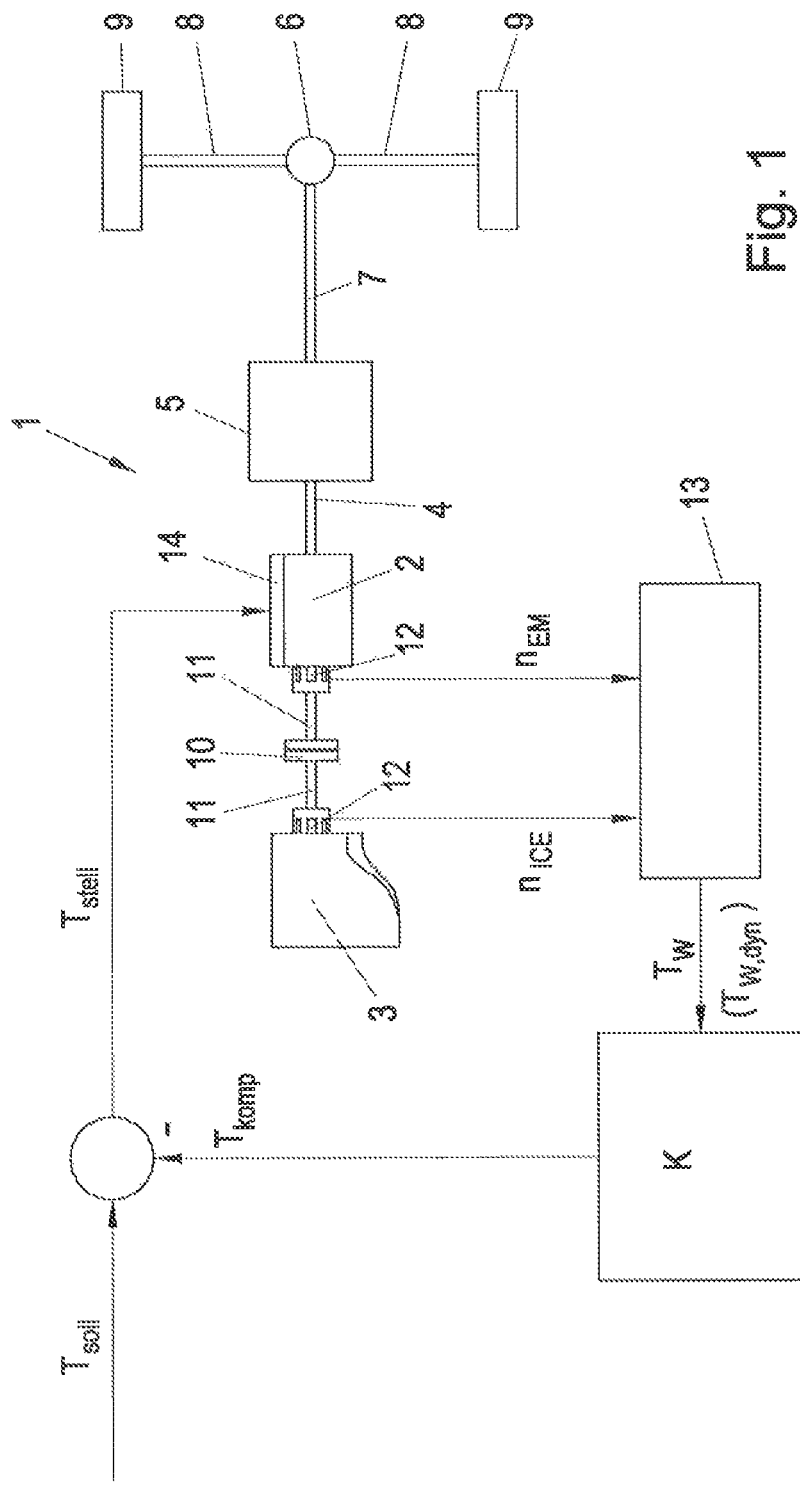
FIG. 1 shows a block diagram of the control of the drive train of a hybrid vehicle.

FIG. 1 shows a drive train 1 of a hybrid vehicle composed of an electric motor 2 which is connected to the transmission 5 via a transmission shaft 4. The transmission 5 drives a differential gear 6 via a drive shaft 7, e.g., in the form of a cardan shaft. The differential gear 6 in turn drives two vehicle wheels 9 via two side shafts 8. Furthermore, the electric motor 2 is connected to an internal combustion engine 3 via engine shafts 11 and a coupling 10. Via the coupling 10, the internal combustion engine 3 can be connected as needed. Of course, other configurations of a drive train 1 are also possible, e.g., without transmission 5 or directly driven vehicle wheels 9. Other electrical components that are needed and are well known per se, such as a battery, a battery management system, a converter, etc., are not illustrated in FIG. 1 for reasons of clarity.

If the internal combustion engine 3 is engaged in the drive train 1, rotational irregularities occur in the engine shaft 11 between the internal combustion engine 3 and the electric motor 2, which rotational irregularities are to be compensated for (in the sense of reducing) in the drive train 1. For this purpose, a compensation controller K is provided which determines a compensation torque $T_{stell}$, by means of which the target torque $T_{soll}$ for determining the controlling torque $T_{stell}$ for the drive controller 14 (substantially motor controller and converter) of the electric motor 2 is corrected. For example, the target torque $T_{soll}$ is predefined by a higher-level control unit 15, e.g., a hybrid control unit. Here, the shaft torque $T_W$ of the engine shaft 11 (when the coupling 10 is engaged, one shaft can be assumed) serves as input for the compensation controller K. The shaft torque $T_W$ can be measured directly or, as in the present case, can be estimated by means of a control-oriented torque estimator 13 from the speed $n_{ICE}$ of the internal combustion engine 3 and the speed $n_{EM}$ of the electric motor 2. Such torque estimators 13, e.g., in the form of an extended Kalman filter, are well known, which is the reason why they are not explained in more detail here. The speeds $n_{ICE}$, $n_{EM}$ can be detected by suitable speed sensors 12 (which normally are already installed in the drive train 1).

Also, the constant component of the shaft torque $T_W$ can be filtered out by the torque estimator 13 so that only the dynamic component of the shaft torque $T_{W,dyn}$, which comprises the rotational irregularities, is processed in the compensation controller K. However, the constant component can also be removed in the compensation controller K, e.g., by a filter at the input of the compensation controller K. The following explanation applies equally to $T_W$ and $T_{W,dyn}$.

However, due to the speed measurement and the processing of the measured speeds $n_{ICE}$, $n_{EM}$ in the torque estimator 13, the shaft torque $T_W$ or $T_{W,dyn}$ is only available with a time delay. Moreover, controlling and the responsiveness of the control elements itself introduces a time delay. The processing- controlling- and system-related delays or dead times are generally designated hereinafter as system delay. However, the system delay can be determined in advance, e.g. on a drive train test bench, and can be regarded as being known. Optionally, the system delay can also be estimated. Due to the system delay, the drive controller 14 of the electric motor 2 can only respond to the rotational irregularity of the engine shaft 11 with a time delay and too slowly. In order to still be able to compensate these rotational irregularities, future (predictive) system-delay-free actual values of the shaft torque $T_{W,dyn}$ are now determined for the compensation by utilizing the cyclic work cycle of the combustion engine 3 and are used for controlling, as described below by means of FIG. 2.

Figure 2:
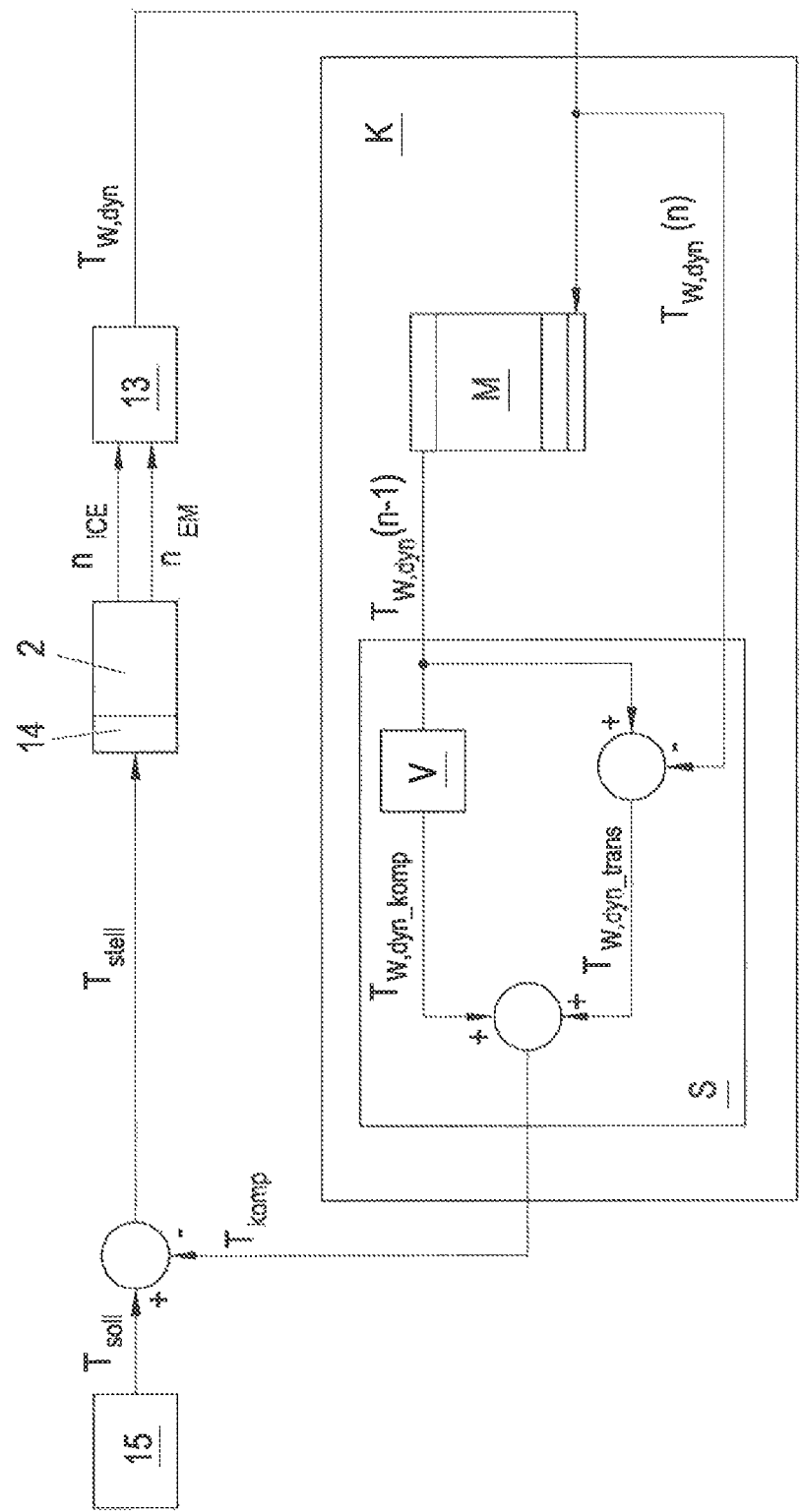
FIG. 2 shows a block diagram of the compensation controller.

A work cycle, e.g., a complete combustion cycle of all cylinders in an internal combustion engine (e.g., 720° crank angle for a gasoline engine), is carried out recurringly. This circumstance is utilized. For this purpose, a storage unit M is provided in the compensation controller K, in which the shaft torques $T_{W,dyn}(n-1)$ of at least one work cycle (n-1) of the combustion engine 3 preceding the current work cycle (n) are stored. Thus, the values of a past work cycle, preferably of the immediately preceding work cycle, are always stored in the storage unit M. Storing preferably takes place in an angle- or time-resolved manner in discrete steps, e.g., one value of the shaft torque $T_{W,dyn}$ per crank angle degree or per millisecond. The storage M is preferably configured as a cyclic storage (as indicated in FIG. 2), i.e., that the stored values are triggered by the selected angle or time resolution and are shifted through in a resolution-triggered manner until they fall out of the storage M again. For example, if a resolution of one value per crank angle degree is selected, the storage M has 720 storage spaces for a work cycle to be stored.

The shaft torques of the preceding work cycle $T_{W,dyn}(n-1)$ are now time-synchronously (or angle-synchronously) fed from the storage M to a calculation unit S, which means that at the current time (or angle), with regard to the work cycle, the value of the past work cycle (n-1) stored in each case at the same time (or angle) is fed into the calculation unit S. Likewise, the current shaft torques $T_{W,dyn}(n)$ are fed to the calculation unit S.

The current shaft torques $T_{W,dyn}(n)$ change from one work cycle (n-1) to the next work cycle (n) by a potentially present transient portion. If the shaft torque $T_{W,dyn}$ does not change over a work cycle, the drive train is in a quasi-stationary operation which recurs each work cycle, wherein this portion is designated as iterative portion. In this case, the transient portion would be zero. The dynamic of the transient portion is lower than the dynamic of the iterative portion.

In a preferred method, the stored values of the shaft torque $T_{W,dyn}$(n−1) of the preceding work cycle (n−1) are now used to determine predictive (future) shaft torques and to thereby compensate for the system delay. For this purpose, a transient portion in the form of the transient shaft torques $T_{W,dyn\_trans}$ is first calculated in the calculation unit S by time-synchronously (or angle-synchronously) subtracting the current shaft torques $T_{W,dyn}$(n) from the stored preceding shaft torques $T_{W,dyn}$(n−1). However, the system delay is still included in this transient portion $T_{W,dyn\_trans}$.

Furthermore, predictive shaft torques $T_{W,dyn\_komp}$ are now determined in a correction unit V by compensating the system delay of the stored preceding shaft torques $T_{W,dyn}$(n−1). This is done, e.g., in that the associated stored value of the shaft torque $T_{W,dyn}$(n−1) is not passed on to the current crank angle (or time), but instead the value that lies temporally ahead by the known system delay, thus a future value, is passed on. For this purpose, for example the correction unit V itself can comprise a storage unit for past shaft torques $T_{W,dyn}$(n−1) so as to be able to determine and pass on the correct values. The (predictive) shaft torques $T_{W,dyn\_komp}$ compensated in this manner (without system delay) and the transient shaft torques $T_{W,dyn\_trans}$ (with system delay) are now added resulting in a compensated shaft torque $T_{komp}$ which finally is fed back to the control. Thus, the compensated shaft torque $T_{komp}$ is a mixture of a predictive portion without system delay and a transient portion with system delay. In the predictive portion, which is now free from the system delay, there the information with the high dynamic which is required for in-phase feedback control is included. The dynamic of the transient portion is substantially lower than the dynamic of the predictive portion, which is the reason why the system delay is no problem here.

The correction unit V in the calculation unit S can also be omitted if, e.g., the storage M has two outputs, wherein the shaft torques $T_{W,dyn}$(n−1) associated with the current angle (or time) are output at one output, and the values of the shaft torques $T_{W,dyn\_komp}$ temporally shifted by the system delay are output at the other output, thus, if the correction unit V is integrated in the storage. As an alternative, two cyclic storage units can be provided in the compensation controller K, wherein in each case the entire work cycle is time-resolved or angle-resolved, e.g. 720° crank angle for a gasoline engine, and stored in one storage unit, and the work cycle shortened by the system delay, e.g. 690° crank angle for a gasoline engine and a system delay of 30°, is stored in the other storage unit. Thus, a "future" value in terms of the system delay is always present at the second output.

The drive controller 14 thus receives a controlling torque $T_{stell}$ representing a variable that includes a predictive component which is shifted into the future by the system delay. In this manner, the drive controller 14 is able to compensate for the rotational irregularities of the engine shaft 11 by means of the electric motor 2.

The invention claimed is:

1. In a drive train of a hybrid vehicle which includes an electric motor and an internal combustion engine, the electric motor being connected to drive wheels by a drive shaft and to the internal combustion engine by an engine shaft, wherein a drive controller controls the electric motor by applying a controlling torque ($T_{stell}$) thereto, a method of compensating for rotational irregularities introduced into the drive train by the internal combustion engine which comprises: determining a shaft torque ($T_W$(n)) of the engine shaft of a current work cycle (n) of the internal combustion engine, feeding the shaft torque ($T_W$) to a compensation controller in which is stored a shaft torque ($T_W$(n−1)) of a previous work cycle (n−1), calculating a compensated shaft torque ($T_{comp}$) from the shaft torque ($T_W$(n)) of the current work cycle (n), the shaft torque ($T_W$(n−1)) of the previous work cycle (n−1), and a shaft torque of a previous work cycle (n−1) shifted by a system delay, and adjusting a predefined target torque ($T_{soll}$) with the compensated shaft torque ($T_{comp}$) to provide the controlling torque ($T_{stell}$) and thereby compensate for the rotational irregularities of the internal combustion engine by using the electric motor.

2. The method according to claim 1, wherein a speed ($n_{ICE}$) of the internal combustion engine and a speed ($n_{EM}$) of the electric motor are detected and fed to a torque estimator which estimates the shaft torque ($T_W$) of the engine shaft.

3. The method according to claim 2, wherein a shaft torque ($T_{W,dyn}$), adjusted for a constant component, is determined and is fed to the compensation controller.

4. The method according to claim 3, wherein a transient shaft torque ($T_{W,dyn\_trans}$) is calculated from the shaft torque ($T_W$(n), $T_{W,dyn}$(n)) of the current work cycle (n) and the shaft torque ($T_W$(n−1), $T_{W,dyn}$(n−1)) of a previous work cycle (n−1) by subtracting the current shaft torque ($T_W$(n), $T_{W,dyn}$(n)) from the stored preceding shaft torque ($T_W$(n−1), $T_{W,dyn}$(n)), a predictive shaft torque ($T_{W\_komp}$, $T_{W,dyn\_komp}$) is determined by compensating for the system delay in the stored preceding shaft torque ($T_W$(n−1), $T_{W,dyn}$(n−1)), and the compensated shaft torque ($T_{komp}$) is determined as a sum of the predictive shaft torque ($T_{W\_komp}$, $T_{W,dyn\_komp}$) and the transient shaft torque ($T_{W\_trans}$, $T_{W,dyn\_trans}$).

* * * * *